US010994820B2

United States Patent
Miwa et al.

(10) Patent No.: US 10,994,820 B2
(45) Date of Patent: May 4, 2021

(54) CONNECTEDLY-FORMED UNDERWATER EXPLORATION DEVICE

(71) Applicants: JAPAN AGENCY FOR MARINE-EARTH SCIENCE AND TECHNOLOGY, Yokosuka (JP); Okamoto Glass Co., Ltd.

(72) Inventors: Tetsuya Miwa, Yokosuka (JP); Dhugal Lindsay, Yokosuka (JP); Masafumi Shimotashiro, Yokosuka (JP); Hiroshi Takahashi, Kashiwa (JP); Atsushi Arai, Kashiwa (JP)

(73) Assignees: JAPAN AGENCY FOR MARINE-EARTH SCIENCE AND TECHNOLOGY, Yokosuka (JP); Okamoto Glass Co., Ltd., Kashiwa (JP)

(*) Notice: Subject to any disclaimer, the term of this patent is extended or adjusted under 35 U.S.C. 154(b) by 0 days.

(21) Appl. No.: 16/652,678

(22) PCT Filed: Dec. 10, 2018

(86) PCT No.: PCT/JP2018/045223
§ 371 (c)(1),
(2) Date: Apr. 1, 2020

(87) PCT Pub. No.: WO2019/131076
PCT Pub. Date: Jul. 4, 2019

(65) Prior Publication Data
US 2020/0239116 A1    Jul. 30, 2020

(30) Foreign Application Priority Data
Dec. 25, 2017    (JP) .............................. JP2017-247139

(51) Int. Cl.
*B63C 11/48* (2006.01)
*B63G 8/00* (2006.01)
(Continued)

(52) U.S. Cl.
CPC .............. *B63C 11/48* (2013.01); *B63G 8/001* (2013.01); *B63G 8/38* (2013.01); *G01V 1/38* (2013.01); *B63G 2008/002* (2013.01)

(58) Field of Classification Search
CPC ........... B63C 11/00; B63C 11/48; B63G 8/00; B63G 8/001; B63G 8/38; B63G 2008/002; G01V 1/00; G01V 1/38
(Continued)

(56) References Cited

U.S. PATENT DOCUMENTS

| 4,446,537 A | 5/1984 | Bowden et al. |
| 5,869,756 A * | 2/1999 | Doherty ................ B63B 22/18 73/170.29 |
| 6,975,560 B2 * | 12/2005 | Berg ..................... G01V 1/3852 367/133 |
| 2015/0138336 A1 | 5/2015 | Ueno et al. |
| 2018/0044056 A1 | 2/2018 | Takahashi |

FOREIGN PATENT DOCUMENTS

| JP | 2003-69864 A | 3/2003 |
| JP | 2012-245944 A | 12/2012 |

(Continued)

OTHER PUBLICATIONS

International Search Report for PCT/JP2018/045223 dated Feb. 26, 2019.
(Continued)

*Primary Examiner* — Lars A Olson
(74) *Attorney, Agent, or Firm* — Yokoi & Co., U.S.A.; Toshiyuki Yokoi

(57) ABSTRACT

Image recording as long as possible during one activity is required in deep sea exploration. Necessity of multi-directional image recording, optical and chemical observations and probing of mineral resources of seabed are also (Continued)

increased. There is no underwater exploration device enable these requirements. It is disclosed that at least one battery-driven underwater exploration body having three pressure-resistant hollow glass spheres for housing an image capturing device, an illumination device, a recording device, an acoustic communication device and a control device controlling thereof and at least one battery body having an approximately the same shape and structure as the underwater exploration body are connected with each other by a connecting tool to provide the connectedly-formed underwater exploration device.

10 Claims, 14 Drawing Sheets

(51) Int. Cl.
  *B63G 8/38* (2006.01)
  *G01V 1/38* (2006.01)
(58) Field of Classification Search
  USPC .............................. 114/321, 339; 367/15, 16
  See application file for complete search history.

(56) References Cited

FOREIGN PATENT DOCUMENTS

| JP | 2016-89026 A | 5/2016 |
| KR | 10-2016-0015994 A | 2/2016 |
| WO | 2014/171513 A | 10/2014 |
| WO | 2014/182880 A | 11/2014 |
| WO | 2017/191693 A | 11/2017 |

OTHER PUBLICATIONS

PCT written opinion dated Feb. 26, 2019.
Mutsuo Hattori, et al, 4. Development of Deep Sea Camera System Using Hollow Glass Sphere, Technical Reports of Japan Marine Science and Technology Center, No. 1, p. 26-31, 1977.
Jun Hashimoto, et al., 4. A Self-Buoyant Free-Fall Deep Sea Camera System Using Pressure-resistant Glass Spheres, JAMSTECTR, 3, 1979.
EDOKKONo.1 project, <http://edokko1.jp/product>.
Japan Agency for Marine-Earth Science and Technology, News Letter, vol. 3/28, Nov. 2018.

* cited by examiner three-branched gap

CONNECTEDLY-FORMED UNDERWATER EXPLORATION DEVICE

TECHNICAL FIELD

The present invention relates to an underwater exploration device suitable, for example, for an ecological impact survey by capturing and monitoring images and the like for a long term as an environmental impact assessment in the water or the seabed. Specifically, the present invention relates to a connectedly-formed deep-sea exploration device capable of coping with an extension of a battery life to photograph videos for a long term and further coping with 360 degree omnidirectional shooting and various measurements. The connectedly-formed deep-sea exploration device is based on a so-called "Edokko-1" which is a free-fall-type video camera system formed by longitudinally connecting three transparent pressure-resistant hollow glass spheres for exploring deep sea.

BACKGROUND ART

Non-Patent Literature 1 reports a successful case of photographing the seabed for housing an electronic flash for illumination and a camera in two pressure-resistant hollow glass spheres made of transparent glass and sinking the pressure-resistant glass spheres to the seabed while being hung down by a wire. In that case, the photographing was succeeded for approximately 10 hours in total by intermittently photographing images using a timer electricity-fed from AA alkaline battery for both the electronic flash and the camera.

Non-Patent Literature 2 also reports a free-fall-type deep sea camera system for housing the camera system in the pressure-resistant hollow glass spheres. A digital timer is used and the electronic flash and the camera are synchronized with the digital timer in Non-Patent Literature 2, while an analog timer is used in Non-Patent Literature 1. Non-Patent Literature 2 reports a case of observing the creatures on the seabed for more than 100 hours in total by intermittently photographing images.

Patent Literature 1 discloses a method of recording images of the creatures or the like in the water for a long term by encapsulating an image recording device such as a video camera and a device for intermittently driving the image recording device into a pressure-resistant sealed container and setting the container in the water for easily recording images of the creatures or the like in the water for a long term.

Patent Literature 2 is an invention of the applicant of the present invention for enabling to capture three-dimensional images in the deep sea or ultra-deep sea by using inexpensive hollow glass spheres. Patent Literature 2 relates to a housing for an underwater video camera, wherein an approximately spherical segmental-shaped correction lens is filled to a spherical segment enclosed by a flat cutting plane and an inner face of a spherical crown of the hollow glass sphere, the flat cutting plane facing and parallel to a lens face of an imaging lens of the video camera housed in the hollow glass spheres.

Patent Literature 3 relates to a submarine exploration device for exploring the bottom of the ultra-deep sea without requiring large scale equipment such as a deep-sea submersible. The submarine exploration device includes: a sphere having an internal sealed space; a sinker for lowering the sphere; and a device for separating the sinker, wherein the sphere houses: electronic devices for the exploration operation; a control device for controlling the electronic devices; and a rechargeable battery allowing noncontact charging to supply power to the included devices. The control device has a transmission and reception means for transmitting and receiving signals to/from the outside in a non-contact manner.

As recited in Non-Patent Literatures 1 and 2, a free-fall type underwater exploration device using the pressure-resistant hollow glass spheres recently attracts people's attention and achieves remarkable results as a so-called "Edokko-1" which is an exploration device for exploring the ultra-deep sea and especially enabling unmanned video shooting. According to the web page (Non-Patent Literature 3) of the "Edokko-1 project", where the applicant of the present invention also joins, "Edokko-1" is a free-fall type underwater exploration device formed by three pressure-resistant hollow glasses: a photograph sphere housing a high-definition video camera; an illumination sphere housing an LED lighting and a storage battery; and a transponder sphere housing an acoustic communication device. The transponder sphere has a role of measuring a linear distance from the mother ship sailing on the sea. In addition, the transponder sphere is connected to a transducer for receiving acoustic signals from the mother ship and a sinker separating device so as to separate the sinker when the device is floated to the sea surface. Accordingly, a communication sphere or the like is also mounted on "Edokko-1" as an accessory for housing the transducer to enable acoustic communication between the sinker used for the sinking (separated when floating) and the mother ship and for housing a GPS device to transmit position information after floated. The video camera, the illumination, the storage battery, the acoustic communication device and the like are housed in the pressure-resistant hollow glass spheres and considered to endure high pressure of the ultra-deep sea of $8000m$ or more.

As the storage battery for driving the image capturing device and the illumination device of "Edokko-1", a lithium polymer battery is used, for example. The storage batteries are housed in both the photograph sphere and the illumination sphere. A through-hole is formed on both the illumination sphere and the photograph sphere. The underwater connector connects the illumination device and the image capturing device. The image capturing and the illumination are synchronized by transmitting ON/OFF signals to the illumination from a controller housed in the photograph sphere. A small storage battery is independently housed in the transponder sphere for the acoustic communication device since the power consumption is smaller than the illumination and the video camera. As described above, two through-holes are formed on the transponder sphere to be connected with the sinker separating device and the transducer.

CITATION LIST

Patent Literature

[Patent Literature 1] Japanese Unexamined Patent Application Publication No. 2003-069864
[Patent Literature 2] Re-publication of PCT International Publication No. 2014/171513
[Patent Literature 3] Japanese Unexamined Patent Application Publication No. 2012-245944
[Patent Literature 4] WO/2017/191693

Non-Patent Literature

[Non-Patent Literature 1] 4. Development of Deep Sea Camera System Using Hollow Glass Sphere, Technical Reports of Japan Marine Science and Technology Center, No. 1, p. 26-31, 1977
[Non-Patent Literature 2] 4. A Self-Buoyant Free-Fall Deep Sea Camera System Using Pressure-resistant Glass Spheres, JAMSTECTR, 3, 1979
[Non-Patent Literature 3] http://edokko1.jp/product

SUMMARY OF THE INVENTION

Problems to be Solved by the Invention

As described above, in the deep-sea exploration, it is required to photograph images as long as possible during one exploration activity even if they are intermittently recorded. For example, ISA (International Seabed Authority) requires the underwater exploration device to monitor for a long term of one year. On the other hand, as recited in Patent Literature 2, more power is consumed in recent years to house two video cameras for photographing three-dimensional images.

Non-Patent Literatures 1 and 2 merely disclose the example of intermittently monitoring totally up to 100 hours.

The technology of Patent Literature 1 merely discloses that the observation was succeeded for an approximately one day by using an intermittent driving device, and the water depth that the observation was performed in was not described.

The above described "Edokko-1" supplies power to the illumination and the video camera using a storage battery (accumulator). According to the web page (Non-Patent Literature 3), video recording of high-definition can be continuously performed for 10 hours. However, it is difficult and costly to frequently sail to distant seas to observe the seabed. Thus, it is required to make the observation as long as possible during one exploration. However, in the present specification, it is revealed that the battery life cannot be guaranteed for the long term monitoring of one year since the power is consumed much especially for the standby power and the illumination. Thus, the battery life cannot be guaranteed even when the batteries are housed in both the pressure-resistant hollow glass sphere for illumination and that for photographing, and the illumination and the photographing are intermittently performed, for example, three times a day for every three days and the time for continuing one illumination and the photographing is one minute. Under the above described circumstances, a system having an enhanced battery is required to guarantee the battery life for the long term monitoring of at least one year.

Patent Literature 3 discloses a submarine exploration device capable of supplying power by noncontact charging. However, the charging is impossible when the exploration device is in the deep sea and when the pressure-resistant hollow glass spheres is covered with a protective cover even if the exploration device is on the sea surface.

Furthermore, in the deep-sea exploration, necessity of the observation in all directions is increased in addition to the unidirectional image recording, necessity of optical and chemical observation of the deep-sea environment is increased in addition to the image recording of the creatures or the like, and necessity of probing the mineral resources of the seabed is increased.

Means for Solving the Problem

The first invention is made for solving the above described problems and relates to a connectedly-formed underwater exploration device, having: at least one battery-driven underwater exploration body formed by three pressure-resistant hollow glass spheres for housing an image capturing device, an illumination device, a recording device, an acoustic communication device and a control device, the control device controlling the image capturing device, the illumination device, the recording device and the acoustic communication device; and at least one battery body having an approximately same shape and structure as the underwater exploration body, wherein the underwater exploration body and the battery body are connected with each other by a connecting tool.

Here, the battery-driven underwater exploration body formed by three pressure-resistant hollow glass spheres for housing an image capturing device, an illumination device, a recording device, an acoustic communication device and a control device for controlling the image capturing device, the illumination device, the recording device and the acoustic communication device is an equivalent body of the above described "Edokko-1".

The battery body is a body formed by at least one pressure-resistant hollow glass sphere to house at least one battery. The battery is connected via the underwater cable and the underwater connector in parallel to the batteries of the illumination unit, the image capturing unit, the recording unit and the control unit housed in the pressure-resistant hollow glass spheres of the underwater exploration body so as to supply power from the battery of the battery body to the illumination unit, the image capturing unit, the recording unit and the control unit housed in the pressure-resistant hollow glass spheres of the underwater exploration body.

The first invention relates to the connectedly-formed underwater exploration device having a structure of connecting at least one underwater exploration body and at least one battery body with each other by a connecting tool. The operation life of the underwater exploration device can be extended by the electric power supplied from the battery body. In addition, as described later, the desired functions can be added according to the purpose by adding the device having other purposes than the battery to the battery body (e.g., photographing, illumination, environmental measurement).

The second invention relates to a connectedly-formed underwater exploration device, having: at least one battery-driven underwater exploration body formed by three pressure-resistant hollow glass spheres for housing an image capturing device, an illumination device, a recording device, an acoustic communication device and a control device, the control device controlling the image capturing device, the illumination device, the recording device and the acoustic communication device, wherein a battery body having an approximately same shape and structure as the underwater exploration body is connected horizontally to at least one of left and right ends of the underwater exploration body by a connecting tool so that the connectedly-formed underwater exploration device forms an approximately triangular prism shape.

Namely, the second invention is a concrete example of the typical embodiments of the first invention. The second invention relates to the connectedly-formed underwater exploration device having a basic structure of an approximately triangular prism shape formed by connecting the battery body having the pressure-resistant hollow glass spheres (hereafter, referred to as a battery sphere) housing the battery to at least one of left and right ends of the equivalent body of "Edokko-1" (FIG. 1).

As described above, in FIG. 1, an "Edokko-1" equivalent body 11 is formed by three pressure-resistant hollow glass spheres having different functions (i.e., photograph sphere 21, illumination sphere 22, transponder sphere 23). Generally, the image capturing device is a video camera. The image capturing device is housed in the photograph sphere 21 together with other devices such as the recording device, the control device and the battery. Generally, an illumination light is housed in the illumination sphere 22 together with the battery. The acoustic communication device is housed in the transponder sphere 23. The above described three pressure-resistant hollow glass spheres are covered with a protection cover made of resin to prevent an accidental breakage during handling or in other situations. The protection cover made of resin is mounted on a frame body made of metal or resin to form one unitized body. As other accessories shown in FIG. 1, sinker 41 for sinking the device in the water and feeding rack 42 for attracting the creatures are provided. The present invention relates to the connectedly-formed underwater exploration device formed by connecting the frames of a plurality of unitized bodies by a connecting tool, wherein one unitized body is a conventional "Edokko-1" equivalent body 11 and the other is a battery body 12.

The structure of the battery body 12 is typically similar to the "Edokko-1" equivalent body 11. The battery body 12 is formed by three pressure-resistant hollow glass spheres to house at least one battery in at least one of the pressure-resistant hollow glass spheres. Similar to the "Edokko-1" equivalent body 11, the pressure-resistant hollow glass spheres are covered with the protection cover made of resin and the protection cover made of resin is mounted on a frame body made of metal or resin to form one battery body 12.

At least one of the three pressure-resistant hollow glass spheres which form the battery body 12 is a battery sphere 24 housing at least one battery. However, it is not necessary for the battery sphere 24 to house only the battery. It is possible to use one of the pressure-resistant hollow glass spheres as the battery sphere and use the other two as the photograph sphere and the illumination sphere. In such a case, there is an advantage capable of capturing images in a plurality of directions. However, since two or three "Edokko-1" equivalent bodies 11 are connected, the maximum term of the monitoring is equivalent to the conventional "Edokko-1".

It is also possible not to provide the photograph sphere 21 on the battery body 12 but to provide a sensor sphere 25 for housing other functions such as an optical sensor and a chemical sensor (shown in FIG. 13). In such a case, the function of the underwater exploration device can be expanded.

In an example of the connectedly-formed underwater exploration device of the present invention shown in FIG. 1, a connecting portion 31 for connecting the "Edokko-1" equivalent body 11 and the battery body 12 is formed by a connecting tool using a hinge 34.

In the example shown in FIG. 1, the connected three unitized bodies are fixed by a fixing tool 32 at least at a top face, preferably at both top and bottom faces. The fixing tool 32 is clearly shown in FIG. 7 (top side). A metal bracket having three branches arranged at an angle of approximately 120 degrees to each other is fixed to the frame bodies of the three unitized bodies by bolts. This method is simple. A suspending metal fitting 33 is fixed to the fixing tool on an approximately vertical line passing through a gravity center of the connectedly-formed underwater exploration device. The suspending metal fitting 33 can be used for sinking the connectedly-formed underwater exploration device in the water and collecting it from the water by a crane or the like.

The suspending metal fitting 33 is mounted on an appropriate position so that the connectedly-formed underwater exploration device is vertically hung down. Namely, it is preferable to mount the suspending metal fitting 33 on the approximately vertical line passing through the gravity center of the connectedly-formed underwater exploration device. It is better to determine the position by calculating or measuring the weight balance of the connectedly-formed underwater exploration device in advance. It is preferable to adopt the configuration capable of finely adjusting the mounting position (e.g., elongate hole). It is more preferable to form a three-branched gap inside the three branches so that the suspending metal fitting can be fixed at any position on the three-branched gap (FIGS. 8A and 8B). Consequently, according to the configuration of the connectedly-formed underwater exploration device, the position of the suspending metal fitting can be adjusted on an approximately gravity center (i.e., the approximately vertical line passing through the gravity center) of the connectedly-formed underwater exploration device so that the connectedly-formed underwater exploration device is vertically hung down and vertically entered in the water. For example, one of the fixing tools shown in FIGS. 8A and 8B can be selected according to the configuration of the connectedly-formed underwater exploration device so that the connectedly-formed underwater exploration device is vertically hung down and vertically entered in the water easily.

An internal structure of the battery sphere 24 of the battery body 12 is shown in FIG. 2. Typically, lithium polymer storage battery is stored in the battery sphere 24 as the battery (accumulator) 61. A connection cable 62 is led out from a through-hole formed on the battery sphere 24 and connected to the batteries stored in the photograph sphere and the illumination sphere of the "Edokko-1" equivalent body 11 via an underwater connector 63 and an underwater cable 64. In this case, the underwater cable 64 is preferably connected at the center line side of the approximately triangular prism shape of the connectedly-formed underwater exploration device, without connecting it at the outside of the approximately triangular prism shape. For example, the underwater cable 64 is preferably embedded in the center line side surface of the frame body made of metal or resin or fixed to the surface of the frame body using a U-shaped fastening tool. This is to prevent the underwater cable from getting entangled with obstacles in the water. Thus, the sinking and the floating of the connectedly-formed underwater exploration device are not interrupted.

The wires of the batteries are connected so that all batteries are connected in parallel as shown in FIG. 3. In an example of FIG. 3, all of the pressure-resistant hollow glass spheres of the battery body 12 are formed by the battery spheres 24. In addition, in the "Edokko-1" equivalent body 11 shown in FIG. 3, both the photograph sphere 21 and the illumination sphere 22 house the batteries, and the battery 61 of the battery sphere 24 is connected in parallel with these batteries.

The advantage of connecting the batteries in parallel is that the functions of the connectedly-formed underwater exploration device can be performed continuously as long as at least one battery is alive even if other batteries are worn out.

FIG. 4 shows the connecting tool portion 31. The frame bodies are connected with each other by using the hinge 34 which is shown in FIG. 5 in an enlarged state. Finally, the frame bodies are fixed by the fixing tool 32 at the top face of the approximately triangular prism shape, preferably at both the top and bottom faces. The above described method is simple without requiring a large working space. Thus, assembling and disassembling work can be easily performed on the ship. As described above, the suspending metal fitting 33 can be mounted on the fixing tool 32 provided on the top face. Note that the connecting tool structure is not limited to the hinge 34. For example, instead of the hinge and the fixing tool, a lid-shaped cover which is formed by reinforcing the above described fixing tool, a tying band or a chain can be used for the fixing.

The advantage of using the hinge 34 is that the opening angle between the neighboring unitized bodies can be adjusted according to the size of the pressure-resistant hollow glass spheres and the total number of the connected bodies, for example. When using the lid-shaped cover, it is preferred that a lot of openings are formed on the lid without covering the entire top face or the entire top and bottom faces so as to reduce the resistance received from seawater when sinking and floating the connectedly-formed underwater exploration device of the present invention in the sea. As long as enough structural strength is ensured, the connectedly-formed underwater exploration device of the present invention is preferably formed roughly in a vertical tubular structure (e.g., pipe-shape, tube-shape) in addition to the structure of the approximately triangular prism shape. Since the flow passage of the seawater is formed on the center of the structure, the sinking and the floating can be performed stably.

FIG. 6 is a drawing showing the mounting state of the pressure-resistant hollow glass spheres. A frame body 51 made of metal or resin has three fitting holes 52 to mount the pressure-resistant hollow glass spheres. After the image capturing device, the illumination device, the acoustic communication device, the battery and the like are housed in each of the pressure-resistant hollow glass spheres, the pressure-resistant hollow glass spheres are set to the fitting holes 52, then protection covers 53 made of resin are fitted from the upper and the lower sides, then the protection covers are fixed with each other by screws, and then the protection covers are fixed to the frame body 51 made of metal or resin by screws. Cushion material made of rubber is adhered to several places of the inner face of each of the resin-made protection covers so as to buffer the impact applied to each of the pressure-resistant hollow glass spheres.

After the observation, the sinker 41 is separated by using a sinker separating device 35 to float the connectedly-formed underwater exploration device 1 of the present invention to the surface of sea. Thus, the connectedly-formed underwater exploration device 1 is collected. The sinker separating device and its structure are shown in FIG. 9, and the enlarged drawing is shown in FIG. 10. Normally, the sinker separating device 35 is mounted on the fixing tool located at the bottom face of the connectedly-formed underwater exploration device. When the signal of instructing the separation of the sinker is transmitted from the transponder sphere 23 to an electric heater 56 via the underwater cable 64, the electric heater is heated and nylon thread wound around a cantilever 57 is cut in the electric heater. When the nylon thread is cut, the cantilever 57 from which the sinker 41 is hung down is opened, and a ring of the wire from which the sinker 41 is hung down is released from the cantilever.

It is important that the sinker 41 is also mounted on the approximately vertical line passing through the gravity center of the connectedly-formed underwater exploration device so that the connectedly-formed underwater exploration device sinks vertically in the water and stands vertically with respect to the seabed. Accordingly, same as the fixing tool 32 of the top face, the fixing tool 32 of the bottom face preferably has a structure capable of adjusting the hanging position of the sinker 41 as shown in FIGS. 8A and 8B.

Here, the underwater cable 64 for transmitting the signal of instructing the separation of the sinker from the transponder sphere 23 is embedded in grooves 54a, 54b formed on the frame body and grooves 55 formed on the inner side face of the fitting holes 52 of the pressure-resistant hollow glass spheres shown in FIG. 6, and connected to the sinker separating device 35. As explained above, the connecting cable for the signal of instructing the separation of the sinker is embedded in the grooves. If the underwater cable 64 is exposed, the underwater cable 64 may be entangled with obstacles or cut and damaged by contacting the obstacles in the water and the signal of instructing the separation cannot be transmitted. By embedding the connecting cable, the sinking and the floating of the connectedly-formed underwater exploration device are not interrupted.

For the same reason, in the connectedly-formed underwater exploration device having the approximately triangular prism shape of the present invention, the underwater cable 64 for connecting the batteries of the battery sphere 23 of the battery body 12, the photograph sphere 21 of the "Edokko-1" equivalent body 11 and the illumination sphere 23 with each other is preferably embedded in the center line side surface of the approximately triangular prism of each frame body or fixed to the frame body using a U-shaped fastening tool and connected to each other without connecting them through the outside of the approximately triangular prism.

In the present invention, the battery body 12 is connected to at least one of left and right ends of the "Edokko-1" equivalent body 11. According to the number of the required batteries 61, the battery bodies can be connected to both ends as shown in FIG. 1. Furthermore, the number of the connected battery bodies can be increased by changing the approximately triangular prism shape. When two or three bodies are connected as shown in FIG. 1, the shape is an approximately triangular prism shape, as seen from above. When the neighboring battery bodies are three or more, the shape is a rectangular shape, a pentagonal shape, a hexagonal shape, or a folded shape as seen from above.

FIG. 11 is an example of the present invention formed by four bodies. For example, it is possible to use two bodies as the "Edokko-1" equivalent bodies and use the other two bodies as the battery bodies. In FIG. 11, the "Edokko-1" equivalent bodies are arranged to face opposite to each other. The feeding racks 42 are provided on both "Edokko-1" equivalent bodies. The underwater creatures attracted to the feeding racks 42 can be illuminated by the illumination sphere and photographed by the photograph sphere. The sinker 41 for the sinking can be separately mounted on each of the "Edokko-1" equivalent bodies. However, it is preferred that only one sinker is mounted on the fixing tool located at the bottom face of the connectedly-formed underwater exploration device as described above. By doing so, the entire weight balance can be adjusted by the one sinker to sink the connectedly-formed underwater exploration device vertically into the water.

Effects of the Invention

By connecting a battery-driven underwater exploration body 11 (i.e., free-fall-type video camera system for exploring deep sea) represented by "Edokko-1" with the battery body 12 having an approximately same shape and structure as the underwater exploration body, the battery life of one year can be sufficiently guaranteed in condition that three times a day for every three days and the time for continuing one illumination and the photographing is one minute, for example.

In addition, by connecting the underwater exploration body 11 (i.e., "Edokko-1" equivalent body) with the battery body 12 by using a simple connection method such as the hinge 34, housing, assembling and disassembling work can be easily performed even on the narrow ship.

Furthermore, the pressure-resistant hollow glass sphere of the battery body 12 can be used for other purposes than the battery sphere 24. It can be also used as the photograph sphere 21 or the illumination sphere 22. In addition, it can be also used as the sensor sphere 25 for housing the optical sensor and the chemical sensor (shown in FIG. 13). Namely, the cameras, the illuminations, the batteries and various sensors can be freely housed in the pressure-resistant hollow glass spheres in accordance with the purpose. When the batteries are increased, the exploration device is suitable for the long-term monitoring. When the cameras and the illuminations are increased, the exploration device is suitable for capturing images in a wide angle. When various sensors are housed, the exploration device is suitable for the environment observation. Thus, the specification of the exploration device can be freely selected.

Since the opening angle of the connecting portion is adjustable, the number of the battery bodies with respect to one connectedly-formed underwater exploration body can be arbitrarily increased. Because of this, the shape can be formed into a rectangular prism, a pentagonal prism and a hexagonal prism, or a plurality of bodies is arranged like a flat folding screen and connected with a plurality of batteries. Thus, it is possible to illuminate and photograph a wide range and in a wide angle (maximally 360 degrees in all directions). Namely, since the unitized bodies can be freely and parallelly connected with each other by a simple connecting tool without connecting the unitized bodies by welding. Thus, the specification of the exploration device can be freely selected and the functions can be increased.

In the present invention, the underwater cable is connected by embedding in the grooves formed on the frame body 51 or fixed to the center line side surface of the frame body of the approximately triangular prism shape of the connectedly-formed underwater exploration device using the U-shaped fastening tool. Thus, the underwater cable is prevented from getting entangled with obstacles or being cut and damaged by the obstacles in the water. Thus, the sinking and the floating of the connectedly-formed underwater exploration device are not interrupted.

MODES FOR CARRYING OUT THE INVENTION

In one embodiment of the present invention, "Edokko-1" including the protection cover made of resin and the frame body can be used as it is as the underwater exploration body 11 for connecting the battery body 12. However, the underwater exploration body 11 is not necessarily limited to "Edokko-1". The same effect can be obtained even when connecting other battery-driven underwater exploration device and the battery body.

A necessary number of battery spheres 24 (necessary number of batteries) can be provided on the connected battery body 12 according to the required electric power. Similar to the "Edokko-1" body, three battery spheres 24 can be mounted on one battery body at the maximum.

Figure 1:
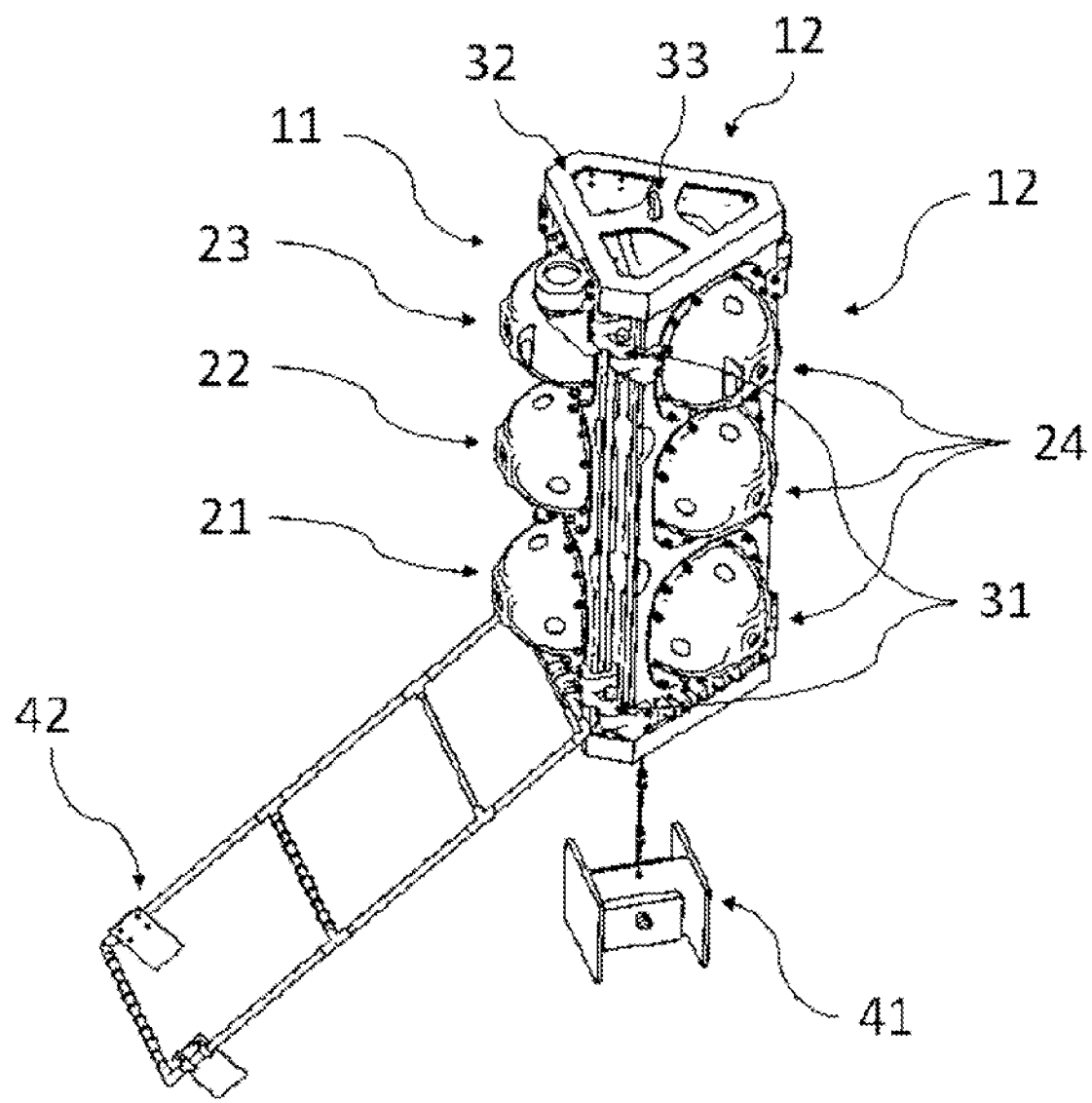
FIG. 1 is a schematic drawing showing the connectedly-formed underwater exploration device having an approximately triangular prism shape formed by connecting one "Edokko-1" body and two battery bodies.

Typically, two battery bodies can be connected horizontally to both left and right ends of one "Edokko-1" equivalent body to form the connectedly-formed underwater exploration device having an approximately triangular prism shape (FIG. 1). In this case, totally six battery spheres 24 can be mounted on the two battery bodies connected to both left and right ends of the "Edokko-1" equivalent body at the maximum. It is preferred that the number of the battery spheres 24 is same between the left and right battery bodies 12 connected to left and right ends of the "Edokko-1" equivalent body 11 for balancing the weight. However, the above described configuration is not essential as long as the balance is carefully considered.

As described above, the batteries 61 housed in the battery spheres 24 of the battery body 12 are connected in parallel with all the batteries housed in the "Edokko-1" equivalent body 11 via the underwater connector 63 and the underwater cable 64. As for the connection method, the batteries of the battery body are connected in parallel with the batteries preliminarily housed in the illumination sphere and the photograph sphere. Since the electric power is provided from the connected batteries of the battery body to the illumination device and the image capturing device, the illumination and the photographing can be performed for a longer term.

In the connectedly-formed underwater exploration device 1 connected with the battery body 12 of the present invention, as described above, the connecting tool portion 31 between the "Edokko-1" equivalent body 11 and the battery body 12 adopts the connecting structure of a simple hinge structure using a movable-type and an insertion-type, for example, in a hinge between a gatepost and a gate door. Thus, disassembling and assembling work can be easily performed even on the narrow ship. Actually, the "Edokko-1" equivalent body 11 and the battery body 12 were separately carried, compactly housed without requiring a particularly large space, easily assembled when in use, easily disassembled after the work, and housed each unitized body separately again.

In the connectedly-formed underwater exploration device 1 connected with the battery body 12 of the present invention, the fixing tool 32 for fixing the "Edokko-1" equivalent body 11 with the battery body 12 is mounted at least on a top face of the connectedly-formed underwater exploration device 1. It is preferred that the fixing tool 32 is also mounted on a bottom face of the underwater exploration body to hang the sinker 41 by a wire from the fixing tool mounted on the bottom face. If needed, an intermediate fixing tool might be fixed between the top face and the bottom face to reinforce the structure.

As described above, the suspending metal fitting (hook) 33 was mounted on the fixing tool 32 of the top side. The position of the suspending metal fitting 33 was located near the vertical line passing through the gravity center of the connectedly-formed underwater exploration device formed by plural bodies. As a result, the connectedly-formed underwater exploration device 1 connected with the battery body 12 of the present invention was vertically entered in the water surface. Since the sinker 41 was located on the fixing tool of the bottom side at a position near the vertical line passing through the gravity center of the connectedly-formed underwater exploration device, the connectedly-formed underwater exploration device of the present invention was vertically sunk in the water. As described above, the connectedly-formed underwater exploration device of the present invention showed the same operability as a conventional "Edokko-1" body both in and on the water.

Same as the "Edokko-1" equivalent body 11, the battery body 12 has sufficient buoyancy. Thus, after the monitoring in the water, the sinker separating device 35 was operated by the signal transmitted from the ship to separate the sinker 41, and the connectedly-formed underwater exploration device was able to float to the water surface without problems. As described above, the sinker is separated by the instruction signal transmitted from the transponder sphere. However, if the separating device is only one, when the separating device is broken, the nylon thread cannot be burnt out. Thus, the cantilever cannot be operated, the sinker cannot be separated, and the connectedly-formed underwater exploration device cannot be floated. This is a serious problem. Therefore, it is preferred that dual systems of the electric heaters are vertically arranged with respect to the nylon thread so that one heater can be operated to perform the cutting even when the other heater is broken.

Embodiment 1

For manufacturing the pressure-resistant hollow glass spheres used for the present invention, same as the case of manufacturing the conventional "Edokko-1" body, a molten glass was press-molded to form a glass-made hollow hemispherical body. An outer diameter of the glass-made hollow hemispherical body was 330 mm, and a thickness of a spherical shell was 17 mm (consequently, an inner diameter of the hemisphere was 296 mm). As described in detail in Patent Literature 4 disclosed by the inventor of the present invention with the other inventors, the pressure-resistant hollow glass spheres were made by joining the glass-made hollow hemispherical bodies with each other at ground joint surfaces after the ground joint surface was precisely polished. Through-holes having a diameter of approximately 11 mm were formed near the apex of two glass-made hollow hemispherical bodies forming the transponder sphere 23 or near the apex of one of two glass-made hollow hemispherical bodies forming the photograph sphere 21, the illumination sphere 22 and the battery sphere 24. The through-holes were used for penetrating the underwater connector 63 for wire connection. In addition to the above described through-holes, through-holes having a diameter of approximately 5 mm were formed near the apex of one of two glass-made hollow hemispherical bodies forming the photograph sphere 21, the illumination sphere 22, the transponder sphere 23 and the battery sphere 24. The above described small through-holes were holes for releasing the air when the sphere was sealed after the necessary devices were housed inside. The purpose is to reduce the pressure by releasing the air in a state that the two glass-made hollow hemispherical bodies are joined with each other. Thus, the two glass-made hollow hemispherical bodies were closely attached.

Figure 12:
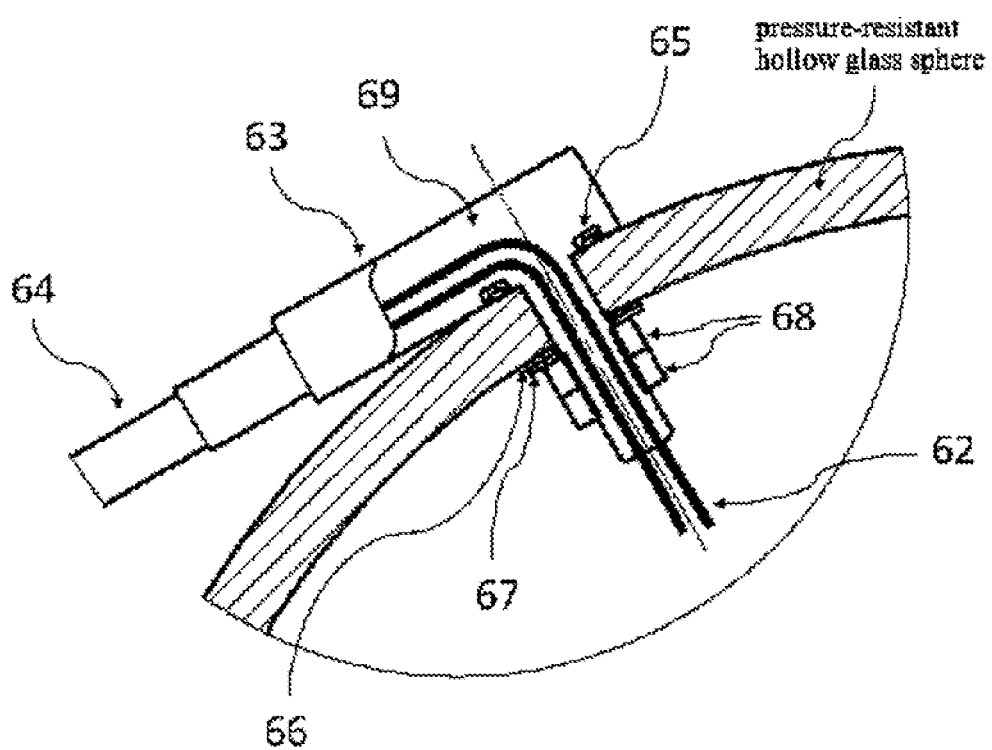
FIG. 12 is an explanatory drawing of the underwater connector formed on the through-hole of the pressure-resistant hollow glass spheres and the underwater cable for the wire connection.

In each of the glass-made hollow hemispherical bodies, the image capturing device (video camera 71), the illumination device (illumination light 72), the batteries, the acoustic communication device and the like were housed. For the wire connection with the batteries 61 housed in the battery sphere 24 of the battery body 12 and the wire connection for synchronizing the image capturing device with the illumination device, the underwater cable 64 was drawn out from the underwater connector 63 penetrated through the through-hole having a diameter of approximately 11 mm and then the two glass-made hollow hemispherical bodies were fitted with each other at the ground joint surfaces (i.e., equatorial planes) to form the pressure-resistant hollow glass sphere (shown in FIG. 3 and FIG. 12).

Then, a vacuum port with an O-ring was inserted through the through-hole having a diameter of approximately 5 mm and fastened and fixed by a bolt and a nut. Then, the air in the pressure-resistant hollow glass sphere was released and depressurized, and then the vacuum port was sealed by a bolt with an O-ring. After that, a butyl rubber tape was wound around the equatorial plane in one turn, and then a vinyl chloride tape was wound on it in three turns. Thus, the pressure-resistant hollow glass sphere was fixed.

In the same method, the acoustic communication device housed in the transponder sphere was connected with the transducer and the device for separating the sinker using the underwater cable. Note that the transducer is a device having functions of a microphone and a speaker. The transducer receives the instruction transmitted from the ship and transfers it to the acoustic communication device and measures a linear distance from the ship transmitting the instruction. The transducer was mounted on the shoulder part of the frame body of the "Edokko-1" equivalent body.

Figure 5:
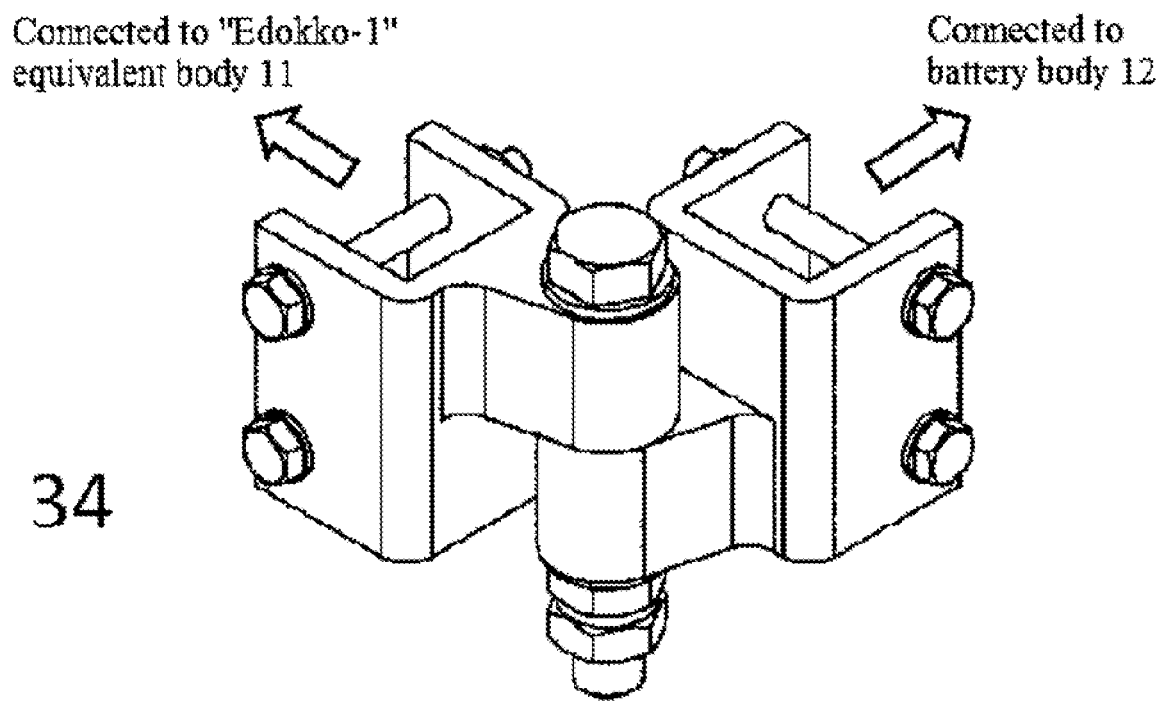
FIG. 5 is an enlarged drawing of the hinge as an example of the connecting structure.
Figure 6:
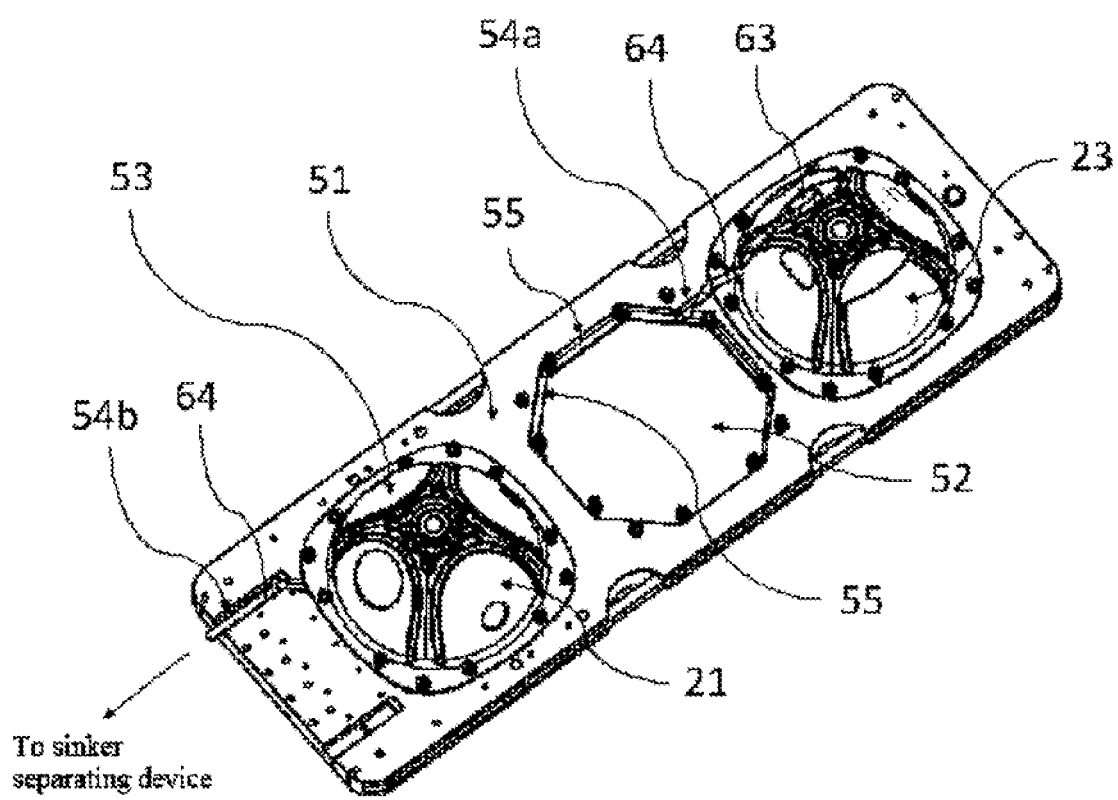
FIG. 6 is a drawing showing a mounting state of the pressure-resistant hollow glass spheres.
Figure 7:
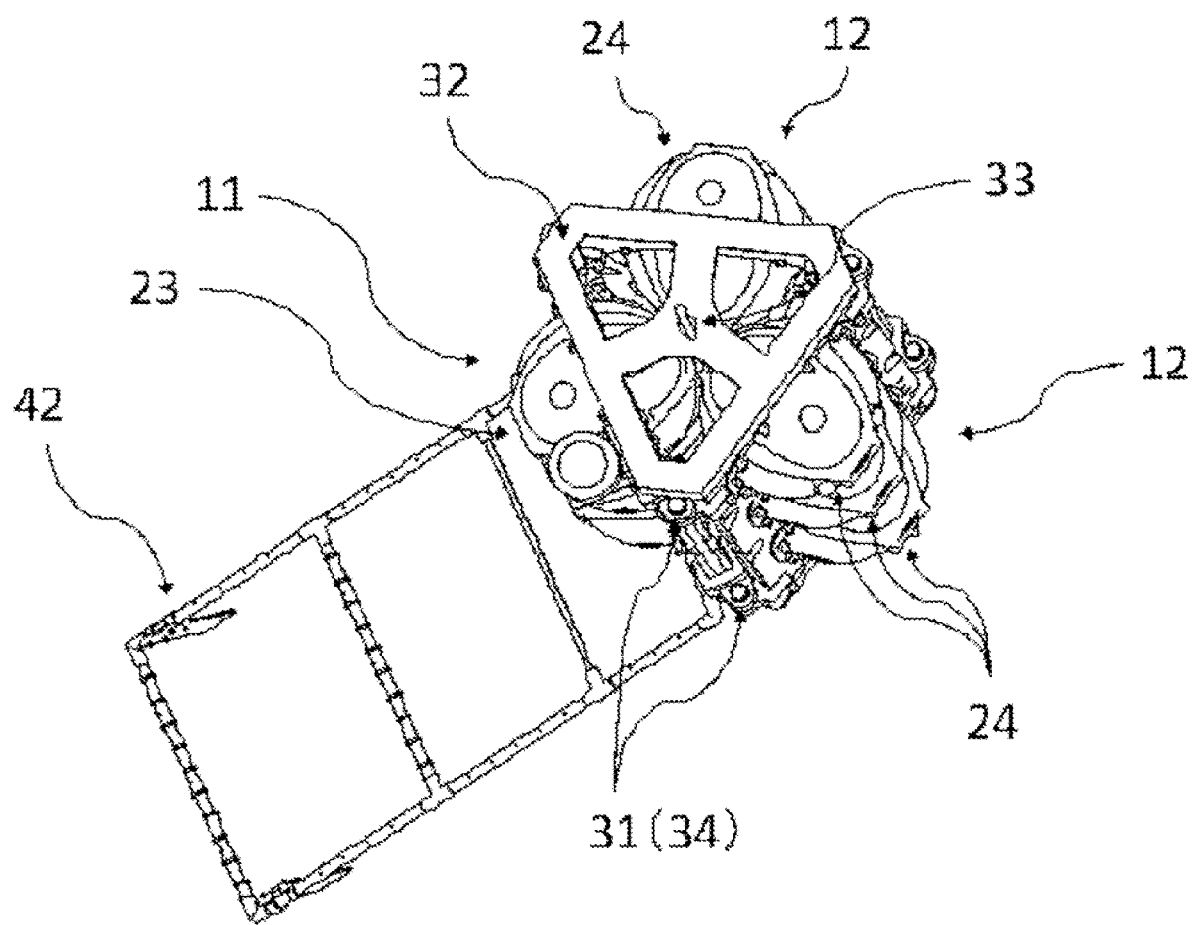
FIG. 7 is a drawing of the connectedly-formed underwater exploration device shown in FIG. 1 as seen from above.
Figure 8A:
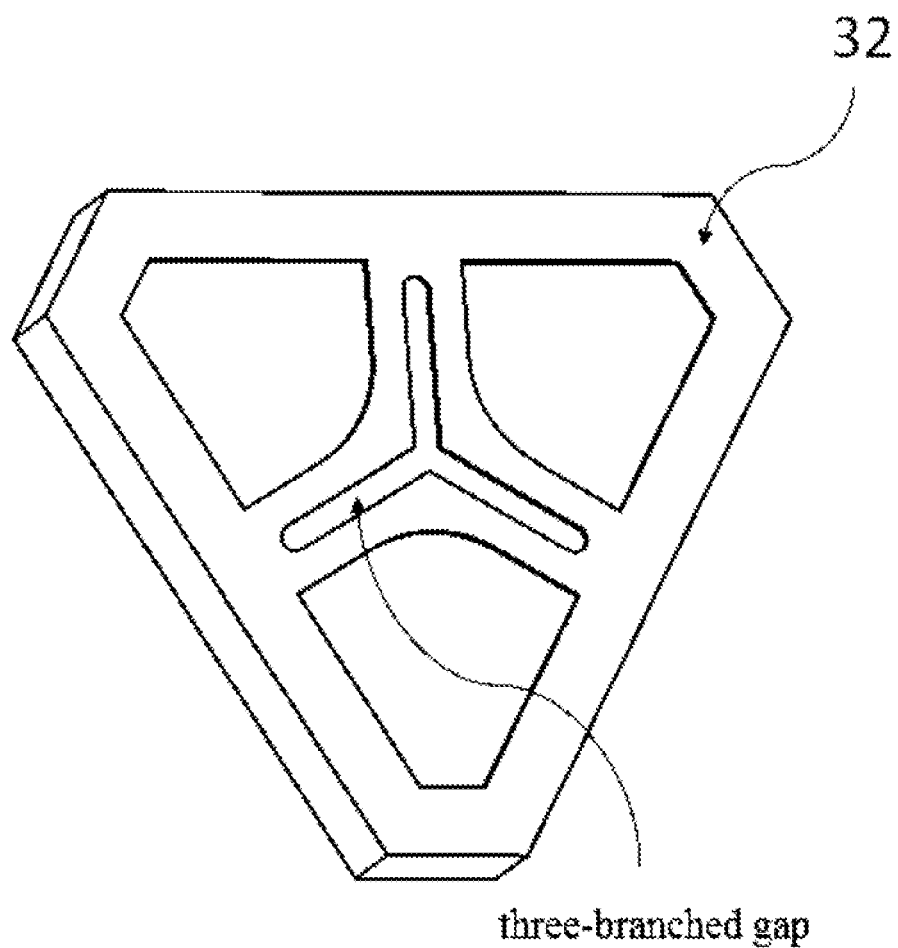
FIG. 8A is a drawing showing an example of the top fixing tool of the top face for mounting the suspending metal fitting on the vertical line passing through the gravity center of the connectedly-formed underwater exploration device (FIG. 8A is also an example of the bottom fixing tool of the bottom face for mounting the sinker on the vertical line passing through the gravity center of the connectedly-formed underwater exploration device).
Figure 8B:
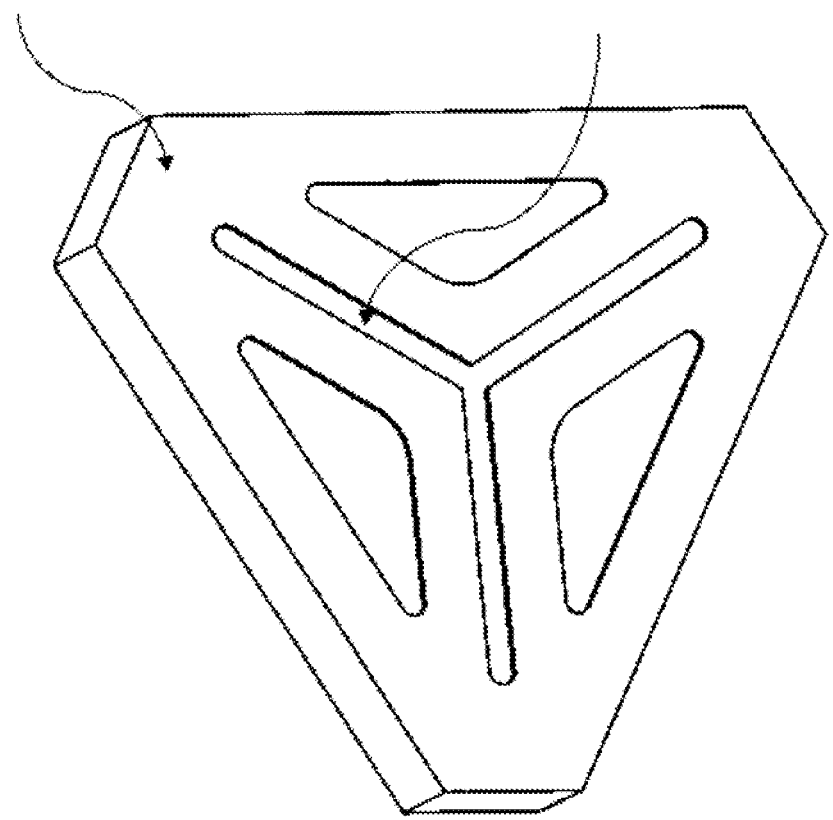
FIG. 8B is a drawing showing another example of the top fixing tool of the top face for mounting the suspending metal fitting on the vertical line passing through the gravity center of the connectedly-formed underwater exploration device (FIG. 8B is also another example of the bottom fixing tool of the bottom face for mounting the sinker on the vertical line passing through the gravity center of the connectedly-formed underwater exploration device).
Figure 9:
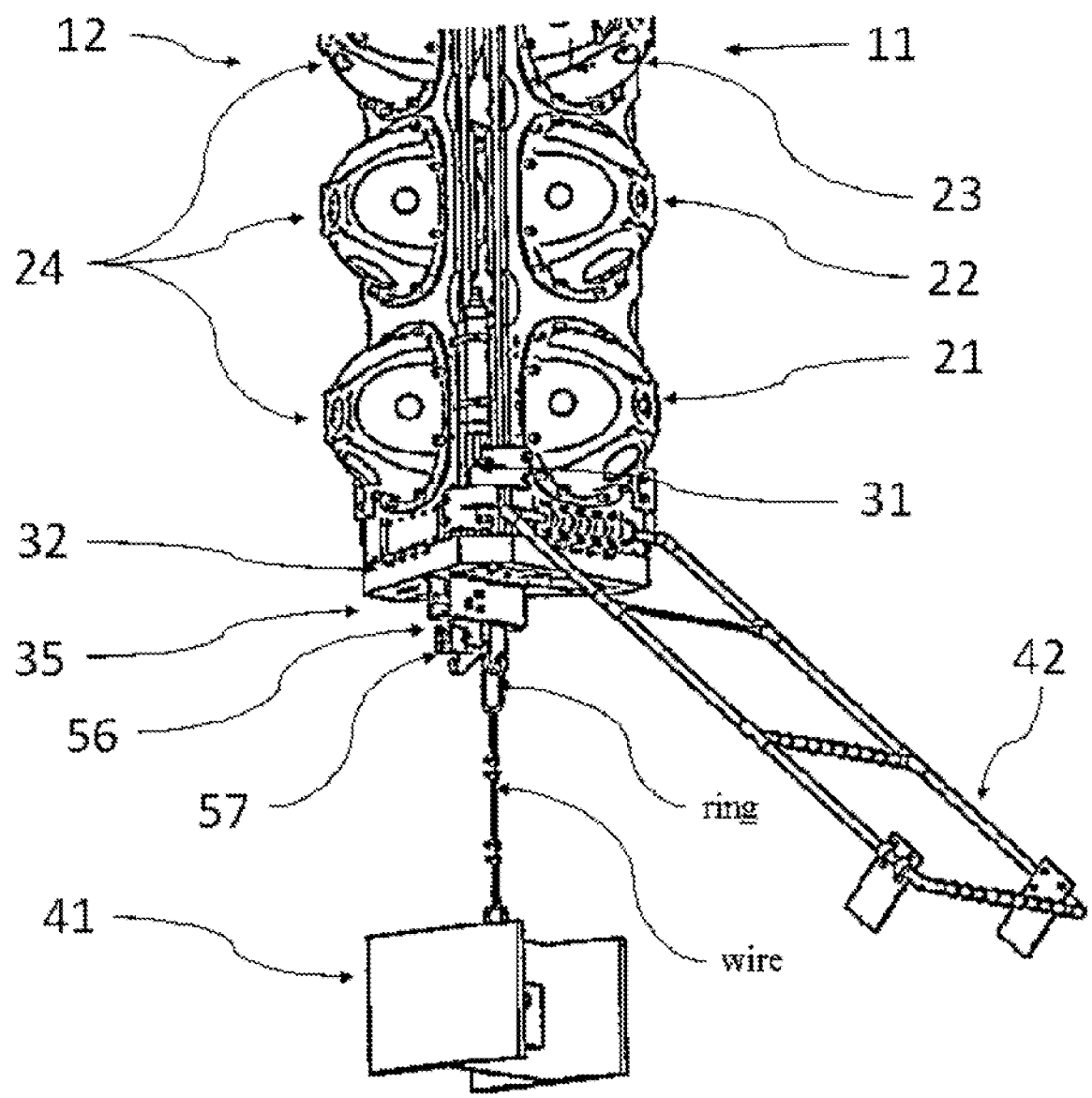
FIG. 9 is a drawing of the connectedly-formed underwater exploration device shown in FIG. 1 as seen from below.
Figure 10:
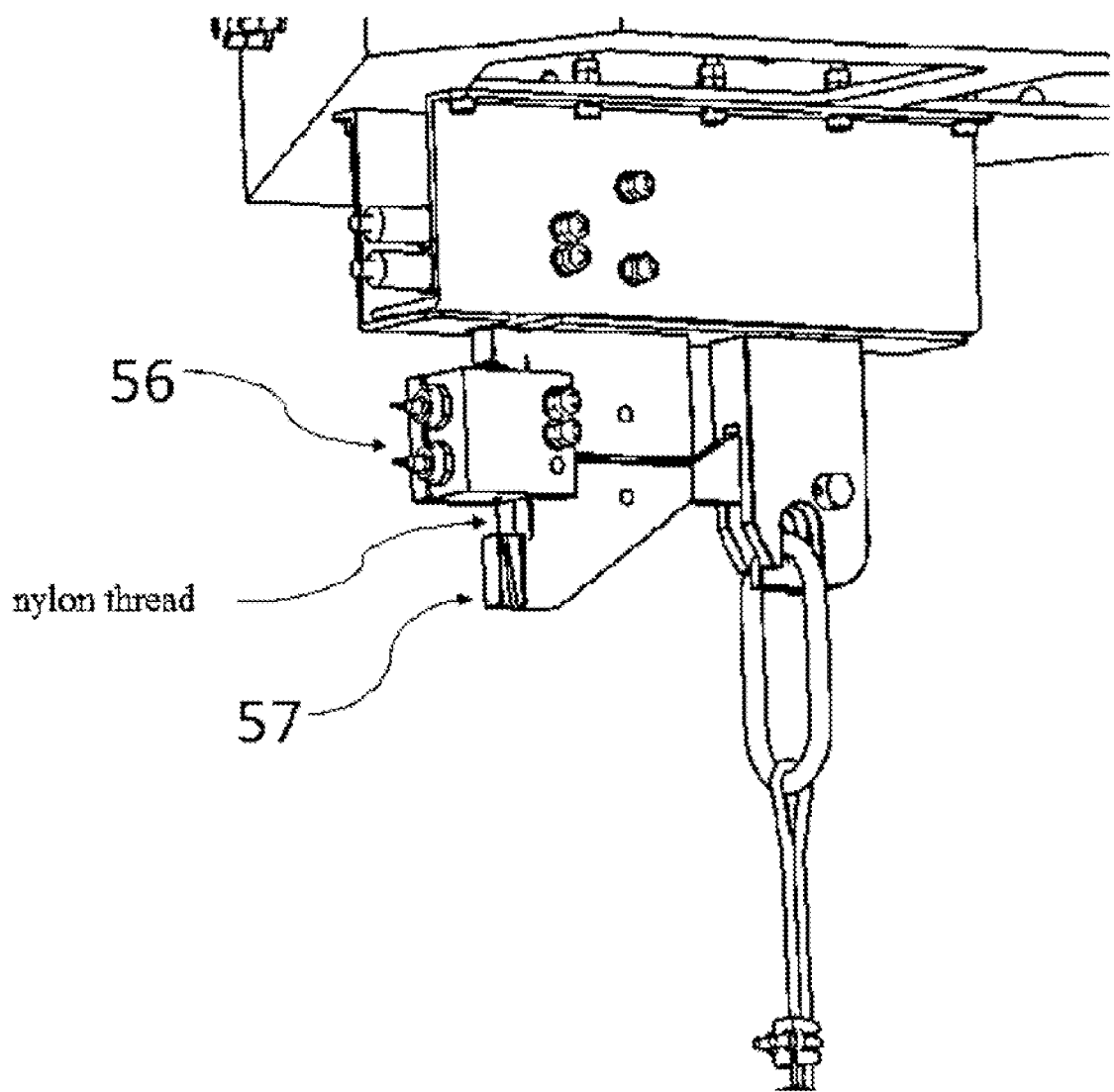
FIG. 10 is an enlarged drawing of the sinker separating device.
Figure 11:
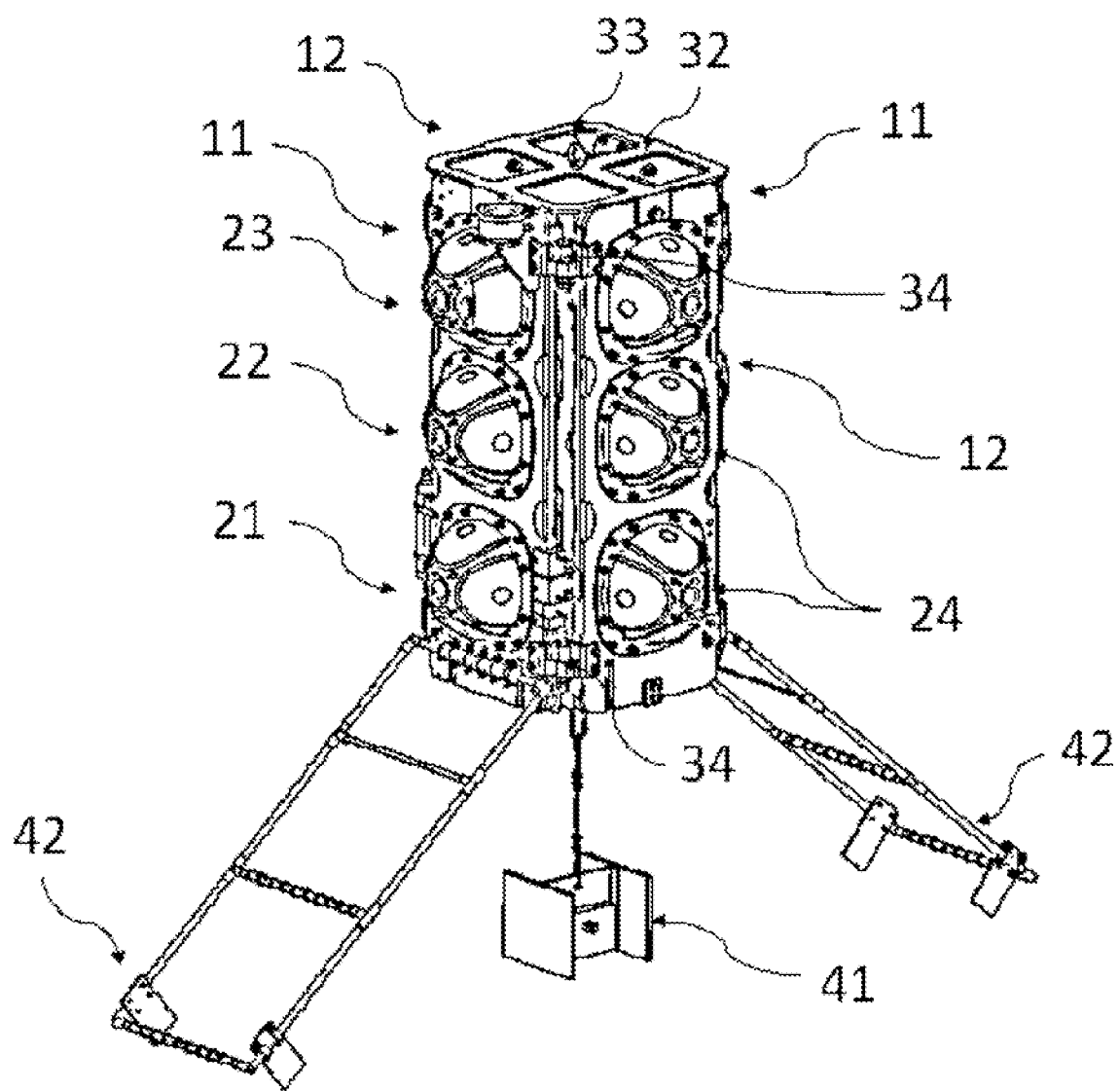
FIG. 11 is a drawing showing the connectedly-formed underwater exploration device having an approximately rectangular prism shape formed by connecting two "Edokko-1" bodies and two battery bodies.

Then, the hinge 34 shown in FIG. 5 was mounted and fixed by screws on both sides of the upper and lower portions of the frame body of the conventional "Edokko-1" body 11 formed by the photograph sphere 21, the illumination sphere 22 and the transponder sphere 23. Thus, the connecting tool portion 31 was formed. Then, the battery bodies 12 were mounted and fixed by screws on each of the other sides of the hinge 34. Thus, the battery bodies 12 were connected (shown in FIG. 5). As shown in FIG. 1, the fixing tool 32 formed in a three-branched shape was mounted on the top face and the bottom face, the fixing tool 32 was fixed with the frame body by screws to fix the "Edokko-1" body with the two battery bodies. The suspending metal fitting 33 was mounted on the center position of the three-branched fixing tool 32 of the top face to be used when hang by the crane. Finally, the sinker 41 was mounted on the three-branched fixing tool 32 of the bottom face via the sinker separating device 35, and the feeding rack 42 and the communication sphere (not illustrated) were further mounted to form the connectedly-formed underwater exploration device 1 connected with two battery bodies. The assembled connectedly-formed underwater exploration device seen from above is shown in FIG. 7 and seen from below is shown in FIG. 9.

Figure 2:
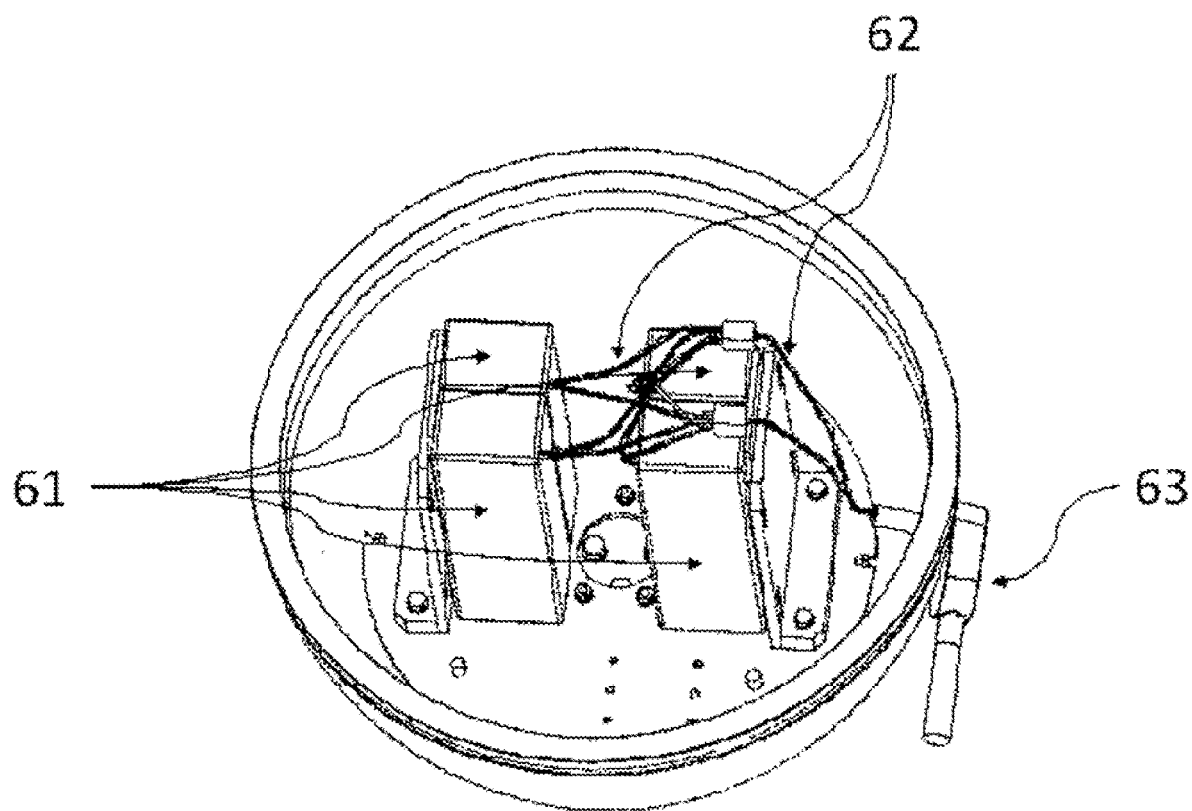
FIG. 2 is a drawing showing an inside of the battery sphere.

Five lithium polymer batteries (manufactured by Turnigy, TS50004S 20-24) were housed in the illumination sphere of the "Edokko-1" equivalent body 11, and four lithium polymer batteries were housed in the photograph sphere. Three battery spheres 24 were housed in each of two battery bodies 12, thus totally six battery spheres 24 were housed in the left and right battery bodies 12. Four batteries 61 were housed in each of the battery spheres 24. Accordingly, totally twenty four batteries were connected in two battery bodies. The capacity of one lithium polymer battery is 70 Wh (14V× 5000 mAh). In this case, the capacity of the batteries of the "Edokko-1" equivalent body is 630 Wh, and the capacity of the batteries of two battery bodies reaches 1680 Wh. Furthermore, the number of the total batteries is thirty three, and the total capacity of the batteries is 2310 Wh. FIG. 2 shows a state of housing four batteries 61 in the battery sphere.

Figure 3:
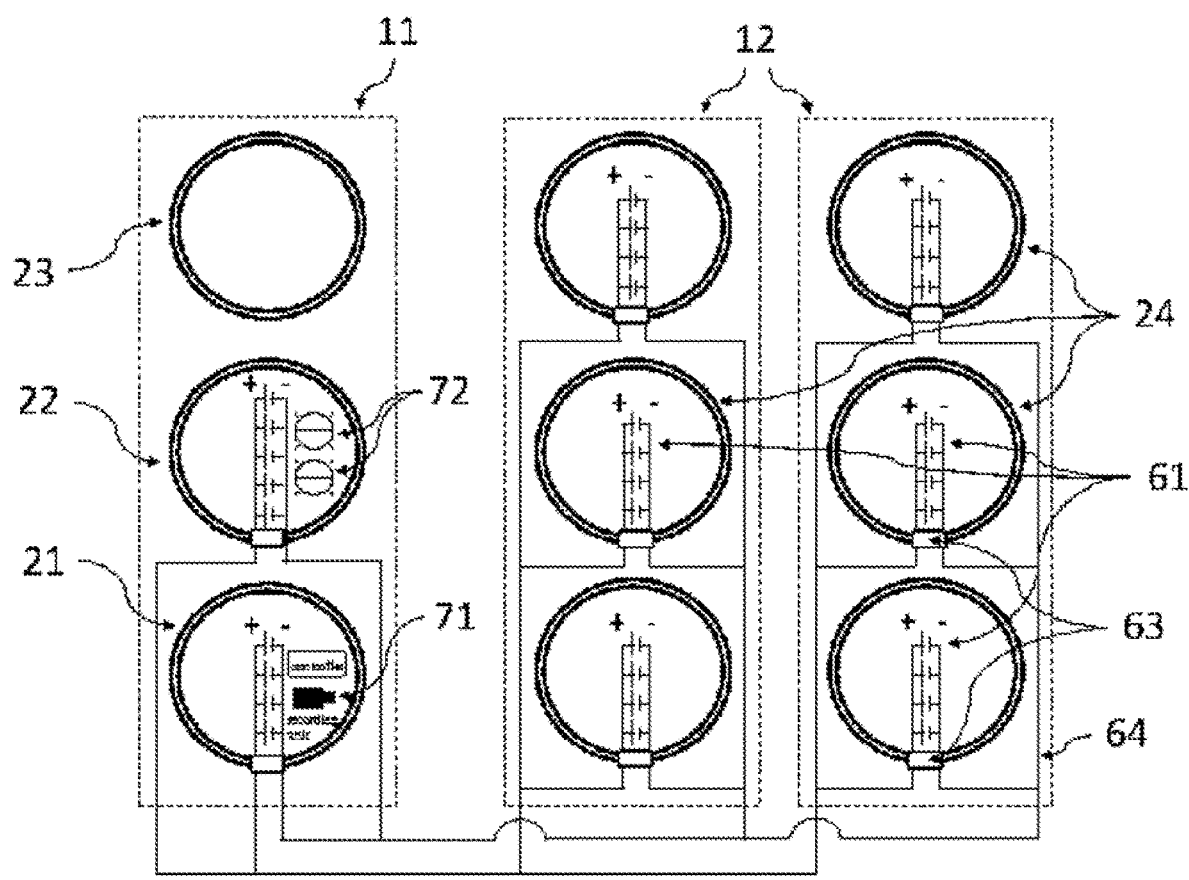
FIG. 3 is an explanatory drawing showing a wire connection between the batteries.
Figure 4:
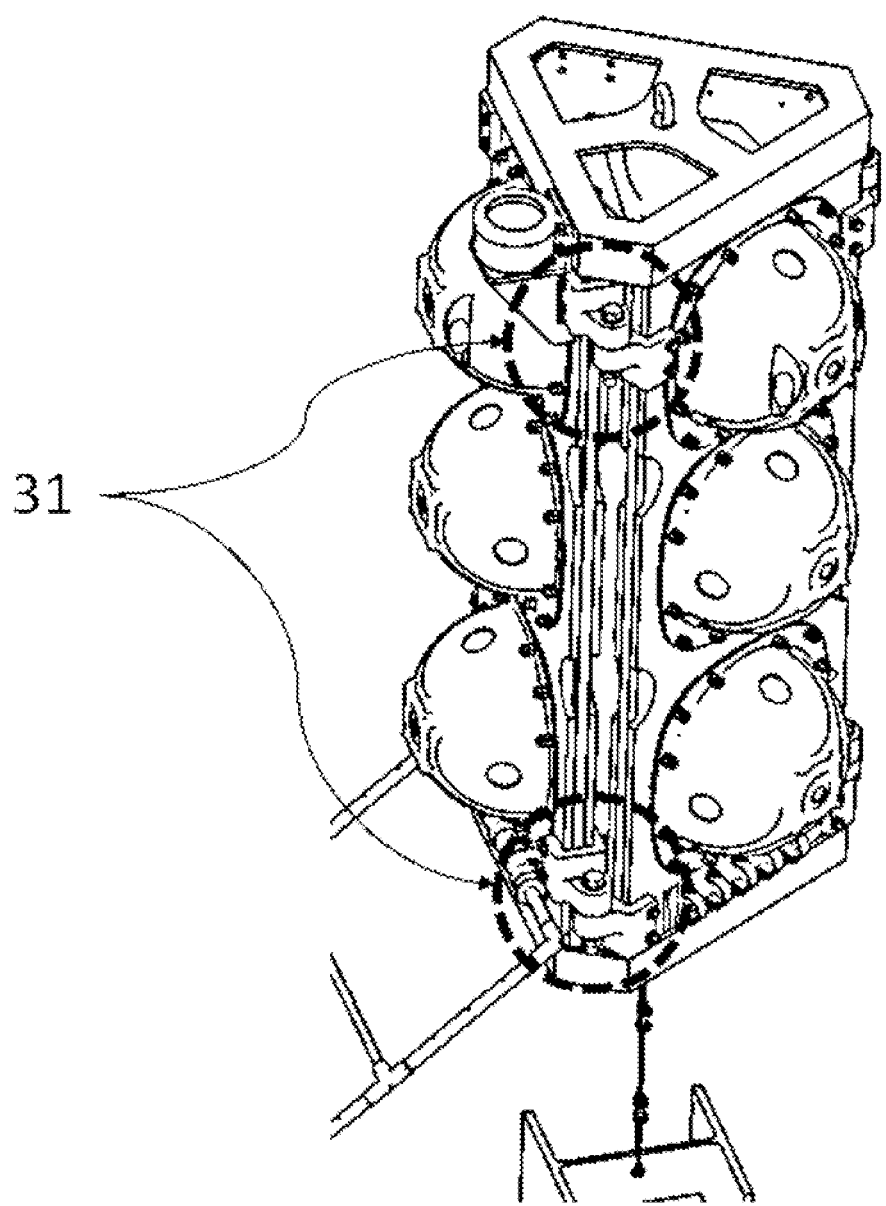
FIG. 4 is a drawing showing the connecting tool portion.

The underwater cables 64 of the batteries drawn out from the through-holes of the photograph sphere, the illumination sphere and the battery sphere were connected in parallel with each other in a pressure-resistant underwater cable joint box (independently designed component) mounted on the "Edokko-1" equivalent body. Thus, the connectedly-formed underwater exploration device of the present invention was completely assembled. The state of the wire connection of the batteries is schematically shown in FIG. 3.

If the illumination and the photographing are performed three times a day for every three days and the time for continuing one illumination and the photographing is one minute, the capacity of the batteries is totally required at least 980 Wh based on theoretical calculation. Thus, the capacity is not enough in the "Edokko-1" body since the capacity is 630 Wh. On the other hand, the capacity of the two battery bodies is 1680 Wh (total capacity of the batteries is 2310 Wh) in the present embodiment. Thus, the capacity is enough. It is found that the long term observation of one year or more is possible.

As described above, although the result differs according to the observation conditions of the long term monitoring, the battery life cannot be guaranteed for one year only by totally nine batteries of the "Edokko-1" body (i.e., five batteries housed in the illumination sphere and four batteries housed in the photograph sphere) in condition that the illumination and the photographing are performed three times a day for every three days and the time for continuing one illumination and the photographing is one minute. However, since two battery bodies are connected, the battery life of one year can be guaranteed.

As for the present embodiment, the consumption condition of the battery, the operability and the like were confirmed by performing operation tests in a large pool.

Embodiment 2

Figure 13:
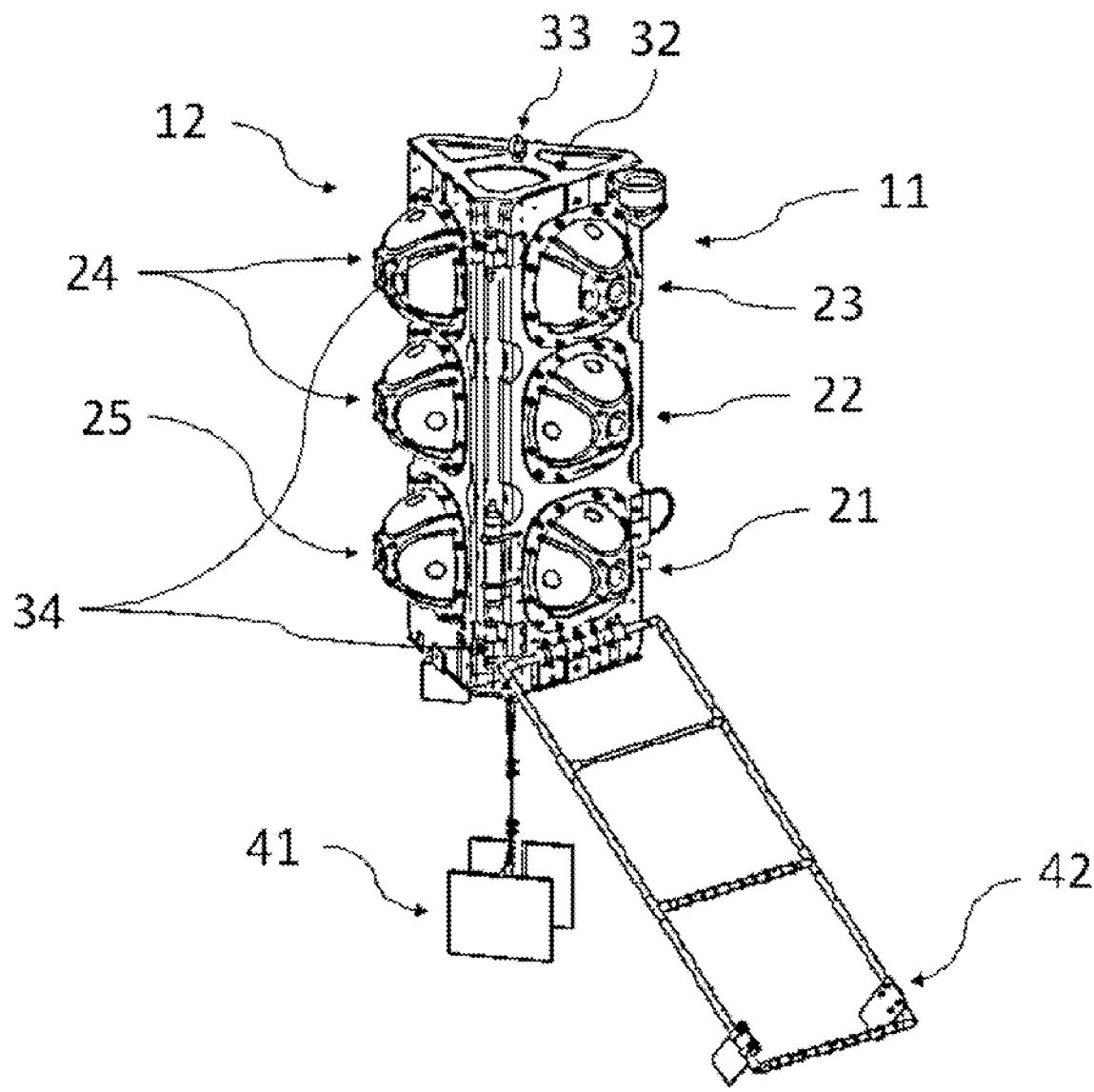
FIG. 13 is an example of the connectedly-formed underwater exploration device having an approximately triangular prism shape formed by connecting one "Edokko-1" body and one battery body.

In the embodiment 1, two battery bodies were fixed to both sides of the frame body of the conventional "Edokko-1" body to form the connectedly-formed underwater exploration device having an approximately triangular prism shape as shown in FIG. 1. In the embodiment 2, the battery body was fixed to only one side of the frame body of the "Edokko-1" body and three pressure-resistant hollow glass spheres were mounted on the battery body. Two of the pressure-resistant hollow glass spheres were used as the battery sphere 24 for housing the batteries and the rest was used as the sensor sphere 25 for housing the sensors. As shown in FIG. 13, an outer appearance is an approximately triangular prism shape. It might be substantially recognized as an approximately V-shape.

The hinge 34 shown in FIG. 5 was mounted and fixed by screws on the upper and lower portions of one side of the frame body of the conventional "Edokko-1" body formed by the photograph sphere 21, the illumination sphere 22 and the transponder sphere 23. Thus, the connecting tool portion 31 was formed. Then, the battery body 12 was mounted and fixed by screws on the other side of the hinge 34. Thus, the battery body 12 was connected. As shown in FIG. 13, the fixing tool 32 formed in a three-branched shape was mounted on the top face and the bottom face, the fixing tool 32 was fixed with the frame body by screws to fix the "Edokko-1" body with one battery body. The suspending metal fitting 33 was mounted on the three-branched fixing tool to be used when hanged by the crane. The mounting position of the suspending metal fitting 33 was determined so that the connectedly-formed underwater exploration device was vertically hung down when the connectedly-formed underwater exploration device 1 was hung down. The mounting position was preliminarily determined by measuring the weight balance. Finally, the sinker 41 was mounted via the sinker separating device 35, and the feeding rack 42 and the communication sphere (not illustrated) were further mounted to form the connectedly-formed underwater exploration device 1 connected with one battery body.

Four batteries 61 were housed in each of two battery spheres 24 in addition to five batteries housed in the illumination sphere of the "Edokko-1" body and four batteries housed in the photograph sphere. Thus, totally seventeen batteries were housed and the total capacity of the batteries was 1190 Wh. If the illumination and the photographing are performed three times a day for every three days and the time for continuing one illumination and the photographing is one minute, the capacity of the batteries is totally required at least 980 Wh based on theoretical calculation. According to the calculation result, it is found that the observation of one year is possible.

In one sensor sphere 25, sensors for optically measuring the dissolved carbon dioxide concentration, the dissolved oxygen concentration and the pH value of the seawater were housed. Consequently, the analysis can be performed by referring to the photographed images, the dissolved carbon dioxide concentration, the dissolved oxygen concentration and the pH value. Note that a small storage battery (12V× 5000 mAh) is independently housed in the transponder sphere 25.

Also for the present embodiment, the consumption condition of the battery, the operability and the like were confirmed by performing operation tests in a large pool.

DESCRIPTION OF THE REFERENCE NUMERALS 1 connectedly-formed underwater exploration device
11 "Edokko-1" equivalent body
12 battery body
21 photograph sphere
22 illumination sphere
23 transponder sphere
24 battery sphere
25 sensor sphere
31 connecting tool portion
32 fixing tool
33 suspending metal fitting
34 hinge for connecting tool portion
35 sinker separating device
41 sinker
42 feeding rack
51 frame body made of metal or resin
52 fitting hole of pressure-resistant hollow glass spheres
53 protection cover made of resin
54a, 54b grooves for embedding underwater cable
55 inner side grooves for embedding underwater cable
56 electric heater (for cutting nylon thread)
57 cantilever
61 battery (accumulator)
62 connection cable
63 underwater connector
64 underwater cable
65 O-ring
66 nylon washer
67 metal washer
68 nut
69 sealing rubber
71 video camera
72 illumination light

What is claimed is:

1. A connectedly-formed underwater exploration device, comprising:
at least one battery-driven underwater exploration body formed by three pressure-resistant hollow glass spheres for housing an image capturing device, an illumination device, a recording device, an acoustic communication device and a control device, the control device controlling the image capturing device, the illumination device, the recording device and the acoustic communication device; and
at least one battery body having an approximately same shape and structure as the underwater exploration body, wherein
the underwater exploration body and the battery body are connected with each other by a connecting tool.

2. A connectedly-formed underwater exploration device, comprising:
at least one battery-driven underwater exploration body formed by three pressure-resistant hollow glass spheres for housing an image capturing device, an illumination device, a recording device, an acoustic communication device and a control device, the control device controlling the image capturing device, the illumination device, the recording device and the acoustic communication device, wherein
a battery body having an approximately same shape and structure as the underwater exploration body is connected horizontally to at least one of left and right ends of the underwater exploration body by a connecting tool so that the connectedly-formed underwater exploration device forms an approximately triangular prism shape.

3. The connectedly-formed underwater exploration device according to claim 1, wherein
in the connectedly-formed underwater exploration device to which the battery body is connected, the underwater exploration body and the battery body are able to be connected and assembled with each other by using a hinge.

4. The connectedly-formed underwater exploration device according to claim 1, wherein
a fixing tool for fixing the underwater exploration body and the battery body with each other is mounted at least on a top face of the connectedly-formed underwater exploration device,
a suspending metal fitting for hanging the connectedly-formed underwater exploration device is provided on the fixing tool, and
a position of the suspending metal fitting is adjustable on an approximately vertical line passing through a gravity center of the connectedly-formed underwater exploration device.

5. The connectedly-formed underwater exploration device according to claim 1, wherein
a fixing tool for fixing the underwater exploration body and the battery body with each other is mounted on a bottom face of the connectedly-formed underwater exploration device,
a sinker of the connectedly-formed underwater exploration device can be hanged down from the fixing tool, and
a position of hanging the sinker is adjustable on an approximately vertical line passing through a gravity center of the connectedly-formed underwater exploration device.

6. The connectedly-formed underwater exploration device according to claim 1, wherein
an underwater cable for connecting the devices housed in the pressure-resistant hollow glass spheres with a sinker separating device for separating the sinker is embedded in a groove formed on a frame body on which the pressure-resistant hollow glass spheres are mounted.

7. The connectedly-formed underwater exploration device according to claim 2, wherein
in the connectedly-formed underwater exploration device to which the battery body is connected, the underwater exploration body and the battery body are able to be connected and assembled with each other by using a hinge.

8. The connectedly-formed underwater exploration device according to claim 2, wherein a fixing tool for fixing the underwater exploration body and the battery body with each other is mounted at least on a top face of the connectedly-formed underwater exploration device, a suspending metal fitting for hanging the connectedly-formed underwater exploration device is provided on the fixing tool, and a position of the suspending metal fitting is adjustable on an approximately vertical line passing through a gravity center of the connectedly-formed underwater exploration device.

9. The connectedly-formed underwater exploration device according to claim 2, wherein a fixing tool for fixing the underwater exploration body and the battery body with each other is mounted on a bottom face of the connectedly-formed underwater exploration device, a sinker of the connectedly-formed underwater exploration device can be hanged down from the fixing tool, and a position of hanging the sinker is adjustable on an approximately vertical line passing through a gravity center of the connectedly-formed underwater exploration device.

10. The connectedly-formed underwater exploration device according to claim 2, wherein an underwater cable for connecting the devices housed in the pressure-resistant hollow glass spheres with a sinker separating device for separating the sinker is embedded in a groove formed on a frame body on which the pressure-resistant hollow glass spheres are mounted.

\* \* \* \* \*